(12) United States Patent
Roy et al.

(10) Patent No.: US 11,017,139 B1
(45) Date of Patent: May 25, 2021

(54) CONCOLIC EQUIVALENCE CHECKING

(71) Applicant: Mentor Graphics Corporation, Wilsonville, OR (US)

(72) Inventors: Pritam Roy, Fremont, CA (US); Sagar Chaki, Sewickley, PA (US); Pankaj Chauhan, San Ramon, CA (US)

(73) Assignee: Siemens Industry Software Inc., Plano, TX (US)

( * ) Notice: Subject to any disclaimer, the term of this patent is extended or adjusted under 35 U.S.C. 154(b) by 0 days.

(21) Appl. No.: 16/828,642

(22) Filed: Mar. 24, 2020

(51) Int. Cl.
*G06F 30/3323* (2020.01)
*G06F 30/3308* (2020.01)
*G06F 119/16* (2020.01)

(52) U.S. Cl.
CPC ...... *G06F 30/3323* (2020.01); *G06F 30/3308* (2020.01); *G06F 2119/16* (2020.01)

(58) Field of Classification Search
CPC ............. G06F 30/3323; G06F 30/3308; G06F 2119/16
USPC ........................................................ 716/107
See application file for complete search history.

(56) References Cited

U.S. PATENT DOCUMENTS

| | | | | |
|---|---|---|---|---|
| 7,711,536 | B2 * | 5/2010 | McNamara | G06F 30/327 703/14 |
| 8,572,527 | B1 * | 10/2013 | Coelho, Jr. | G06F 30/3323 716/102 |
| 8,683,441 | B2 * | 3/2014 | Keidar-Barner | G06F 9/44589 717/124 |
| 10,515,168 | B1 * | 12/2019 | Chauhan | G06F 30/30 |
| 10,515,170 | B1 * | 12/2019 | Kundu | G06F 30/367 |
| 2003/0125920 | A1 * | 7/2003 | Matsuoka | G06F 30/3323 703/15 |
| 2004/0025127 | A1 * | 2/2004 | Takenaka | G06F 30/33 716/103 |
| 2007/0220461 | A1 * | 9/2007 | Baumgartner | G06F 30/3323 716/103 |
| 2011/0119655 | A1 * | 5/2011 | Matsuda | G06F 30/3323 717/126 |

OTHER PUBLICATIONS

Matsumoto et al., Equivalence Checking of High-Level Designs Based on Symbolic Simulation, IEEE, pp. 1129-1133 (Year: 2009).*
Roy et al., High Coverage Concolic Equivalence Checking, Design, Automation and Test in Europe, pp. 462-467 (Year: 2019).*
Pinto et al., RTL Functional Test Generation Using Factored Concolic Execution, IEEE, pp. 1-10 (Year: 2017).*

(Continued)

*Primary Examiner* — Suresh Memula

(57) ABSTRACT

This application discloses a computing system to select a set of one or more values for control signals internal to multiple circuit designs, generate input stimulus for the circuit designs based, at least in part, on the selected set of values for the control signals, and simulate the circuit designs with the input stimulus, which configures the simulated values of the control signals internal to the circuits designs to the selected set of values. The computing system can perform an equivalence check on the circuit designs using results of the simulation. The computing system can select another set of values for the control signals, and determine that at least the other set of values for the control signals are not realizable during simulation with any input stimulus.

20 Claims, 5 Drawing Sheets

(56) References Cited

OTHER PUBLICATIONS

Koelbl et al., Solver Technology for System-level to RTL Equivalence Checking, Synopsys, All pages (Year: 2009).*
C. Pixley, "A theory and implementation of sequential hardware equivalence," IEEE Transactions on Computer-Aided Design of Integrated Circuits and Systems (TCAD), vol. 11, No. 12, Dec. 1992.
G. Martin and G. Smith, "High-Level Synthesis: Past, Present, and Future," IEEE Design Test of Computers, vol. 26, No. 4, Aug. 21, 2009.
P. Chauhan, D. Goyal, G. Hasteer, A. Mathur, and N. Sharma, "Noncycle-accurate sequential equivalence checking," 46th ACM/IEEE Design Automation Conference, Aug. 28, 2009.
J. W. Duran and S. C. Ntafos, "An Evaluation of Random Testing," IEEE Transactions on Software Engineering, vol. SE-10, No. 4, Jul. 1984.
P. Godefroid, N. Klarlund, and K. Sen, "DART: directed automated random testing," ACM SIGPLAN conference on Programming language design and implementation, Jun. 12, 2005.
H. Kelly J., V. Dan S., C. John J., and R. Leanna K., "As Practical Tutorial on Modified Condition/Decision Coverage,"NASA Langley Reseatch Center, Technical report NASA/TM-2001-210876, May 1, 2001.
P. Godefroid, M. Y. Levin, and D. Molnar, "Automated whitebox fuzz testing," Microsoft Research, Technical report TR-2007-58, Nov. 2008.
K. Sen and G. Agha, "CUTE and jcute: Concolic unit testing and explicit path model-checking tools," 18th International Conference Computer Aided Verification, vol. 4144, Aug. 17, 2006.
C. Cadar, D. Dunbar, and D. R. Engler, "Klee: unassisted and automatic generation of high-coverage tests for complex systems programs," 8th USENIX conference on Operating systems design and implementation, Dec. 8, 2008.
L. Liu and S. Vasudevan, "STAR: Generating input vectors for design validation by static analysis of RTL," IEEE International High Level Design Validation and Test Workshop, Nov. 20, 2009.
L. Liu and S. Vasudevan, "Efficient validation input generation in RTL by hybridized source code analysis," IEEE Design, Automation & Test in Europe Conference, May 5, 2011.
Y. Zhang, W. Feng, and M. Huang, "Automatic generation of high coverage tests for RTL designs using software techniques and tools," IEEE 11th Conference on Industrial Electronics and Applications (ICIEA), Oct. 24, 2016.
A. Ahmed and P. Mishra, "QUEBS: qualifying event based search in concolic testing for validation of RTL models," IEEE International Conference on Computer Design (ICCD), Nov. 23, 2017.
S. Pinto and M. S. Hsiao, "Rtl functional test generation using factored concolic execution," IEEE International Test aonference (ITC), Jan. 1, 2018.
T. Matsumoto, T. Nishihara, Y. Kojima, and M. Fujita, "Equivalence checking of high-level designs based on symbolic simulation," International Conference on Communications, Circuits and Systems, Sep. 18, 2009.
A. Biere, A. Cimatti, E. M. Clarke, O. Strichman, and Y. Zue, "Bounded Model Checking," Advances in computers, vol. 58, Aug. 8, 2003.

* cited by examiner

CONCOLIC EQUIVALENCE CHECKING

TECHNICAL FIELD

This application is generally related to electronic design automation and, more specifically, to concolic equivalency checking of multiple circuit designs.

BACKGROUND

Designing and fabricating integrated circuits typically involves many steps, known as a "design flow." The particular steps of a design flow often are dependent upon the type of integrated circuit, its complexity, the design team, the fabricator or foundry that will manufacture the integrated circuit, or the like. Several steps are common to most design flows for integrated circuits. Initially, the specification for a new integrated circuit is transformed into a logical design. Designers have traditionally directly generated the logical design at the register transfer level (RTL) of abstraction, for example, coding the logical design with a Hardware Design Language (HDL), such as the Very high speed integrated circuit Hardware Design Language (VHDL), SystemVerilog, or the like. The RTL description can describe the integrated circuit in terms of the exchange of signals between hardware registers and the logical operations that can be performed on those signals.

As integrated circuits have become more complex, some designers have elected to describe the logical designs of integrated circuits at a higher level of abstraction, for example, coding the logical design with a high-level programming language, such as C++ or SystemC, and then perform high-level synthesis to compile the logical design written in the high-level programming language into the RTL description of the integrated circuit in a hardware design language. The high-level synthesis operations intend to convert the logical design into an equivalent representation, albeit at a different level of abstraction than the previous representation of the logical design, which retains the functionality of the logical design of the integrated circuit. To help ensure that the high-level synthesis operations did not alter the functionality described in the logical design, the design flow can include equivalence checking to compare the functionality described in the logical designs.

Traditional equivalence checking is performed by formal verification and/or random testing, sometimes called fuzzing. Equivalence checking tools that perform formal verification can check the logical designs for functional equivalence, for example, checking equivalence between a logical design coded in SystemC and a logical design at an RTL level of abstraction, under all possible input scenarios. These equivalence checking tools, however, can face scalability issues for logical designs of industrial complexity. Random testing or fuzzing checks equivalence for a randomly selected set of input stimuli, which scales much better than equivalence checking using formal verification, but provides low coverage of the possible input scenarios. Random testing also does not respect environmental constraints, which can cause equivalence checking tools to produce invalid or redundant stimuli and thus waste time performing unnecessary equivalence checking operations.

SUMMARY

This application discloses a computing system implementing concolic equivalence checking of multiple circuit designs. The computing system can identify control signals internal to the multiple circuit designs, for example, corresponding to condition statements, branches, selection signals to multiplexors, or the like. The computing system can determine values for the control signals capable of occurring in the circuit design and identify the input stimulus capable of prompting those sets of values. The computing system also can determine values for the control signals that cannot be realized in the circuit designs regardless of the input stimulus provided to the circuit designs during simulation. By determining whether the different possible control signal values can be realized or not in the circuit design and then generating input stimulus for those control signal values that can be realized, the computing system can avoid generating invalid and redundant input stimulus.

The computing system can apply the identified input stimulus to the circuit designs during simulation and perform an equivalence check of the circuit designs based on the results of the simulation. When the equivalence check indicates that the circuit designs differ in response to input stimulus, the computing system can output that input stimulus as a counter example of equivalence. When the equivalence check indicates that the circuit designs are functionally equivalent for all realizable values of the control signals, the computing system can report that equivalence of the circuit designs has been proven. Embodiments will be described below in greater detail.

DETAILED DESCRIPTION

Illustrative Operating Environment

Figure 1:
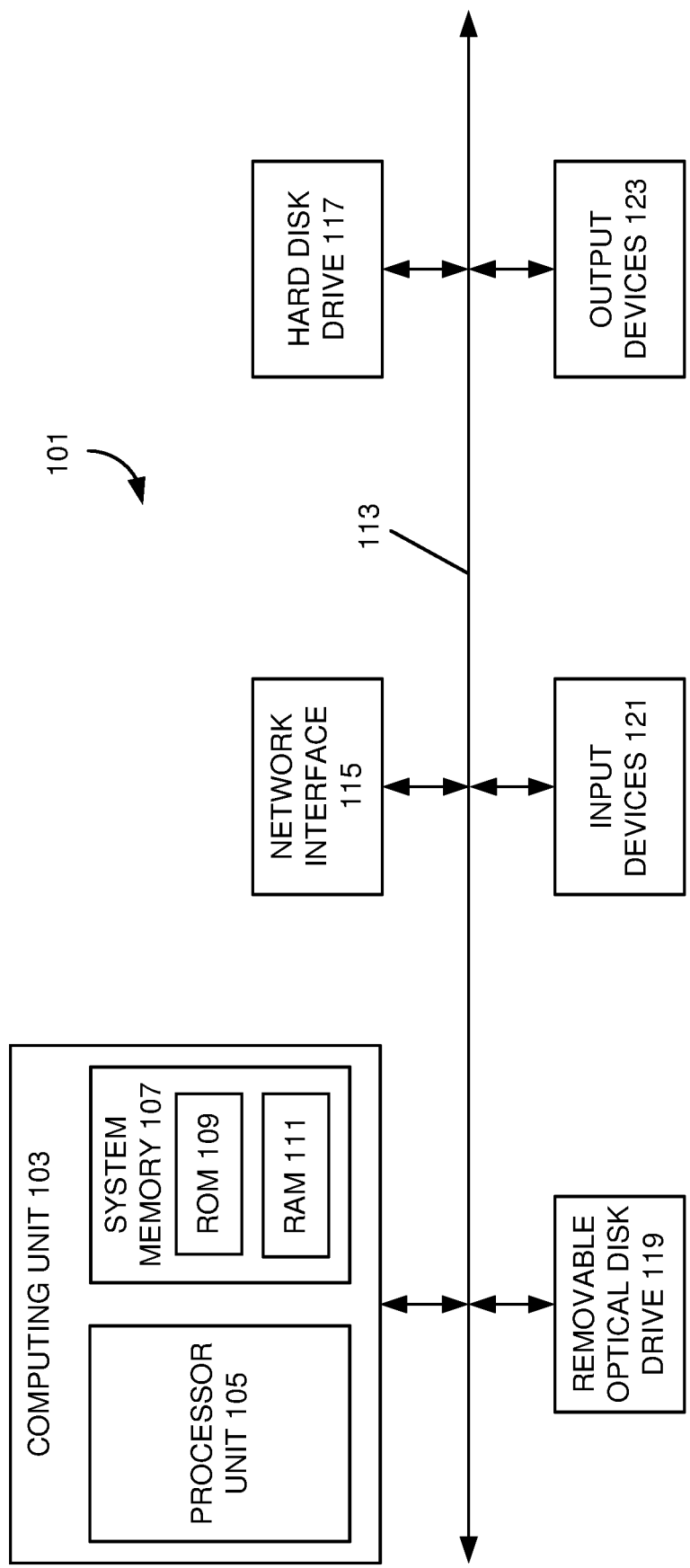
FIGS. 1 and 2 illustrate an example of a computer system of the type that may be used to implement various embodiments of the invention.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
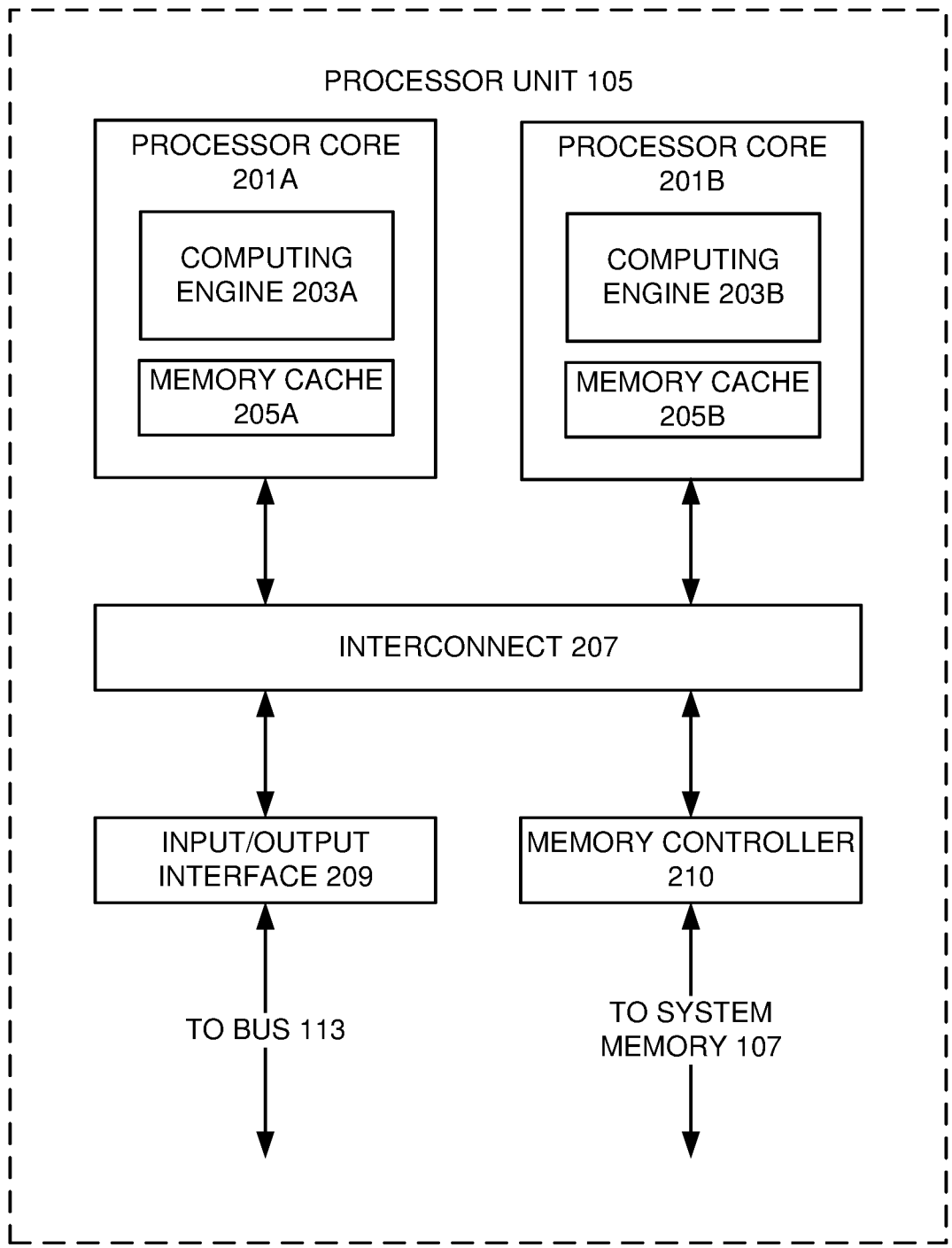

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and is not intended to suggest any limitation as to the scope of use or functionality of alternate embodiments.

Concolic Equivalence Checking

Figure 3:
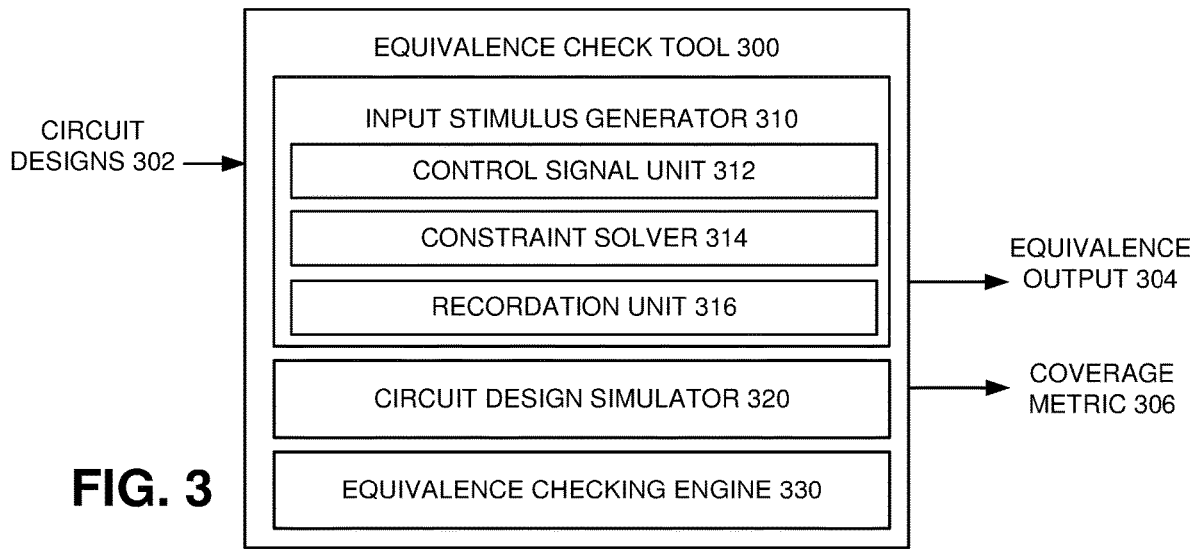
FIG. 3 illustrates an example equivalence checking tool having concolic input stimulus generation according to various embodiments of the invention.

FIG. 3 illustrates an example equivalence checking tool having concolic input stimulus generation according to various embodiments of the invention. Referring to FIG. 3, the equivalence check tool 300 can receive the multiple circuit designs 302, which in some cases can be different representations of a common design, for example, at different levels of abstraction, such as high-level representation coded with System C, C++, or the like, a register transfer level (RTL) representation coded with a Hardware Design Language (HDL), such as the Very high speed integrated circuit Hardware Design Language (VHDL), SystemVerilog, or the like, a gate-level netlist representation, or the like. The equivalence check tool 300 can generate input stimulus for the circuit designs 302, simulate the circuit designs 302, provide the input stimulus to the circuit designs 302 during the simulation, and perform an equivalence check on the circuit designs 302 based on the results of the simulation. The equivalence check tool 300 can generate an equivalence output 304 that can indicate an equivalence of the circuit designs 302 based on the equivalence check, for example, identifying whether the circuit designs 302 are equivalent or whether at least one counter example to equivalence exists. The equivalence check tool 300 also can determine a coverage metric 306 for the equivalence check on the circuit designs 302, which can indicate how the equivalence check of the circuit designs 302 exercised at least a portion of the circuit designs 302.

The equivalence check tool 300 can include an input stimulus generator 310 to perform concolic input stimulus generation based on the circuit designs 302. The input stimulus generator 310 can identify input stimulus capable of realizing different values of control signals within the circuit designs 302 during simulation and identify those values of the control signals that cannot be realized regardless of the input stimulus provided to the circuit designs 302 during simulation.

The input stimulus generator 310 can include a control signal unit 312 to identify control signals internal to the circuit designs 302. In some embodiments, the control signals can correspond to selection signals for multiplexors in an RTL version of the circuit designs 302. The control signals also can correspond to "if" statement, branch statements, or the like, in a SystemC, C++, or the like, version of the circuit designs 302. The control signal unit 312 can select a set of the identified control signals in the circuit designs 302 to utilize in an equivalence check of the circuit designs 302, and can identify the different combinations of values for the selected set of the control signals. For example, if each control signal is binary, i.e., can be set as a 0 or a 1, a selected set of 4 control signals can have 2^4 or 16 possible combinations of values to utilize for an equivalence check of the circuit designs 302.

The control signal unit 312 also can determine a search depth for the equivalence check operations of the circuit designs 302. In some embodiments, the search depth can correspond to a number of clock cycles for the control signals. The control signal unit 312 can determine the possible combinations of values of the selected control signals based on both the number control signals in the selected set and the search depth. Embodiments of the possible combinations of values to utilize for an equivalence check of the circuit designs 302 will be described below in greater detail.

The input stimulus generator 310 can include a constraint solver 314 to utilize environmental constraints described in the circuit designs 302 to determine different input stimulus that, when provided to the circuit designs 302 during simulation, can set the control signals to the different possible values determined by the control signal unit 312. The control signal unit 312, in some embodiments, can perform a depth-first search of the possible combinations of the selected control signals, for example, searching the possible combinations of values of the selected control signals in a depth-first lexicographic order, and provide the results of the depth-first search to the constraint solver 314 for identification of a corresponding input stimulus.

In some embodiments, an attempt by the constraint solver 314 to identify input stimulus for a specific value of the control signals can fail, which can indicate that an input stimulus for the circuit designs 302 does not exist that will set the control signals to the specific value. The control signal unit 312 can utilize the determination that a specific control signal value cannot be realized during simulation to identify other control signal values that also cannot be realized without having the constraint solver 314 attempt to identify an input stimulus for those control signal values. By generating input stimulus for the circuit designs 302 from the possible values for the control signals internal to the circuit designs 302, the input stimulus generator 310 can generate valid and non-redundant input stimulus as well as identify possible control signal values that are not realizable regardless of the input stimulus provided to the circuit designs 302. Embodiments of input stimulus generation from possible control signal values will be described below in greater detail.

The input stimulus generator 310 can include a recordation unit 316 to store the possible control signal values, the control signal values that the constraint solver 314 could utilize to generate input stimulus or control signal values that were realizable, and those control signal values that the constraint solver 314 or the control signal unit 312 determined were unrealizable regardless of the input stimulus provided to the circuit designs 302. In some embodiments, the recordation unit 316 can output the coverage metric 306, which can identify a number of the realizable and unrealizable control signal values relative to a total number of possible control signal values.

The equivalence check tool 300 can include a circuit design simulator 320 to simulate the circuit designs 302. The circuit design simulator 320 can provide the input stimulus generated by the input stimulus generator 310 to the circuit designs 302 during the simulation. The circuit design simulator 320 can generate output values from the circuit designs 302 in response to providing each of the input stimulus to the circuit designs 302 during the simulation.

The equivalence check tool 300 can include an equivalence check engine 330 to compare the output values generated by the circuit design simulator 320 for each of the input stimulus presented to the circuit designs 302 during the simulation. When the output values differ, the equivalence check engine 330 can generate the equivalence output 304, which indicates a lack of equivalence in the circuit designs 302 for a set of control signals having particular values and search depth. In some embodiments, the equivalence output 304 can include a counter example of equivalence, which can include the input stimulus capable of causing the lack of equivalence in the circuit designs 302. When the output values for all of the different input stimulus provided to the circuit designs 302 during simulation are the same or equivalent, the equivalence check engine 330 can generate the equivalence output 304 to indicate an equivalence in the circuit designs 302 for a set of control signals having particular values and search depth.

Figure 4:
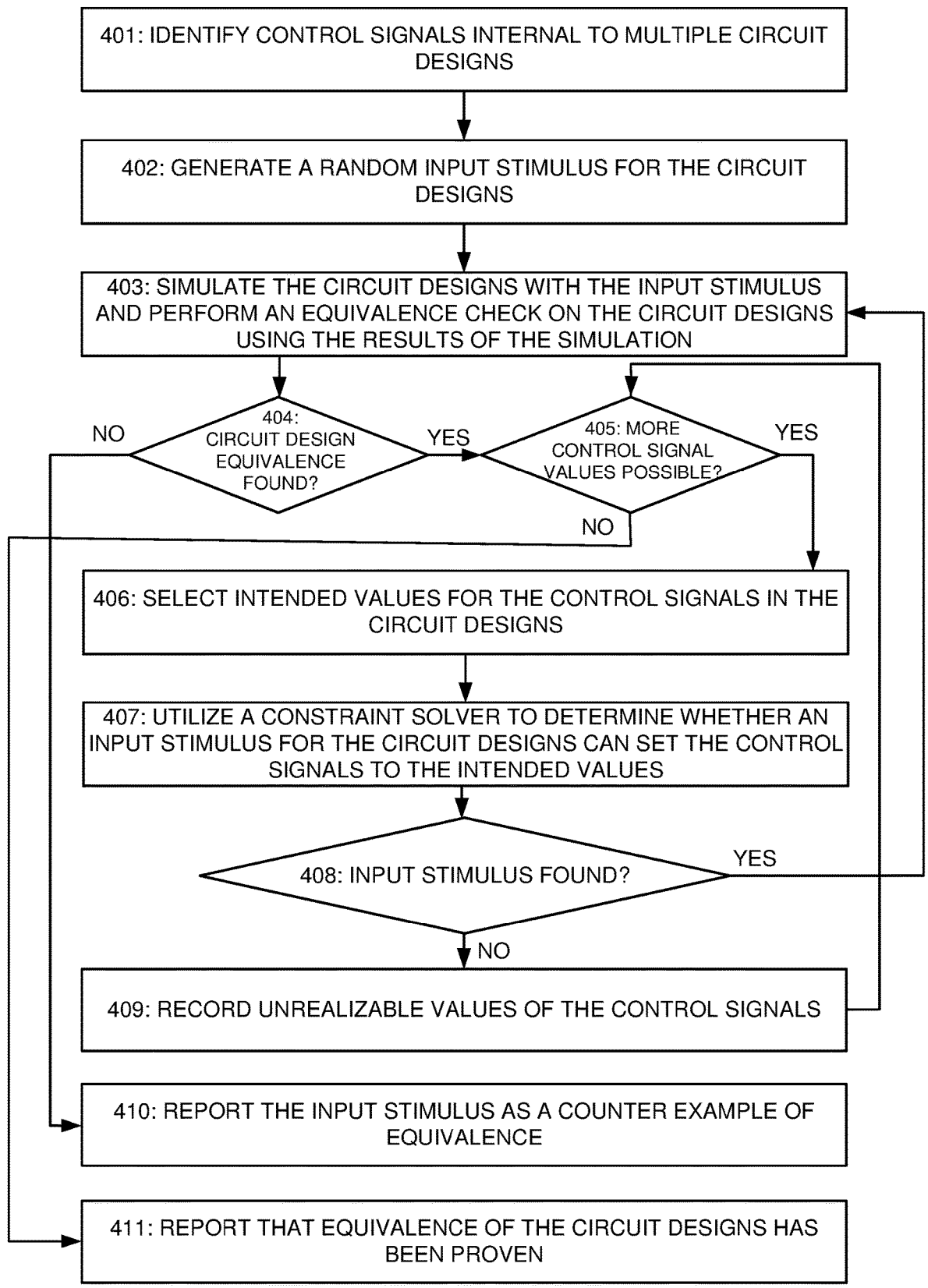
FIG. 4 illustrates a flowchart showing an example implementation of a concolic stimulus generation for equivalence checking according to various embodiments of the invention.

FIG. 4 illustrates a flowchart showing an example implementation of a concolic stimulus generation for equivalence checking according to various embodiments of the invention. Referring to FIG. 4, in a block 401, a computing system implementing an equivalence check tool can identify control signals internal to multiple circuit designs. In some embodiments, the control signals can correspond to selection signals for multiplexors in an RTL version of the circuit designs. The control signals also can correspond to "if" statement, branch statements, or the like, in a SystemC, C++, or the like, version of the circuit designs. The computing system can select a set of the identified control signals in the circuit designs to utilize in an equivalence check of the circuit designs, and can identify the different combinations of values for the selected set of the control signals. The computing system also can determine a search depth for the equivalence check operations of the circuit designs. In some embodiments, the search depth can correspond to a number of clock cycles for the control signals. The computing system can determine the possible combinations of values of the selected control signals based on both the number control signals in the selected set and the search depth.

In a block 402, the computing system implementing the equivalence check tool can generate a random input stimulus for the circuit designs and, in a block 403, the computing system implementing the equivalence check tool can simulate the circuit designs with the input stimulus and perform an equivalence check on the circuit designs using the results of the simulation. The computing system can identify the combination of values that were set in the circuit designs in response to the random input stimulus during the simulation of the circuit designs, and record that combination of values as being realized. The computing system can compare the output values generated in response to the input stimulus presented to the circuit designs during the simulation, and determine whether equivalence was found between the circuit designs for the specific value of the control signals.

In a block 404, the computing system implementing the equivalence check tool can determine whether circuit design equivalence has been found, for example, based on the comparison of the simulation output performed by the computing system in the block 403. When, in block 404, the computing system determines equivalence was not found based on the comparison of the simulation output, execution can proceed to a block 410, where the computing system implementing the equivalence check tool can report the input stimulus as a counter example of equivalence. The counter example of equivalence can include the input stimulus capable of causing the lack of equivalence in the circuit designs.

When, in block 404, the computing system determines equivalence was found based on the comparison of the simulation output, execution can proceed to a block 405, where the computing system implementing the equivalence check tool can determine whether more possible control signal values exist to be processed for equivalence. The computing system, in some embodiments, can review the list of possible combination of values for the control signals and determine whether any combination of control values exists that has not been determined to be realized or unrealizable. When the list of possible combination of values for the control signals does not include any combination of values that have not been determined to be realized or unrealizable, execution can proceed to a block 411, where the computing system implementing the equivalence check tool can report that equivalence of the circuit designs has been proven.

When the list of possible combination of values for the control signals includes at least one combination of values yet to be realized or determined to be unrealizable, execution can proceed to a block 406, where the computing system implementing the equivalence check tool can select intended values for the control signals in the circuit designs. In some embodiments, the computing system can perform a depth-first search of the possible combinations of the selected control signals, for example, searching the possible combinations of values of the selected control signals in a depth-first lexicographic order, and select one of the possible combinations of the selected control signals as the intended values for the control signals in the circuit designs. Embodiments of the depth-first search will be described below in greater detail.

In a block 407, the computing system implementing the equivalence check tool can utilize a constraint solver to determine whether an input stimulus for the circuit designs can set the control signals to the intended values. The computing system can identify environmental constraints described in the circuit designs, for example, between the inputs to the circuit designs and the locations of the control signals in the circuit designs, to determine whether an input stimulus exists that, when provided to the circuit designs during simulation, could set the control signals to the intended values.

In a block 408, the computing system implementing the equivalence check tool can determine whether input stimulus was found by the constraint solver. When the constraint solver implemented by the computing system does not identify input stimulus that could set the control signals to the intended values, execution can proceed to a block 409, where the computing system implementing the equivalence check tool can record the intended values of the control signals as unrealizable. The computing system also can identify other control signal values that also cannot be realized based on the determination that the intended values of the control signals are unrealizable, and record the identified control signal values as unrealizable.

When the constraint solver implemented by the computing system identifies input stimulus that could set the control signals to the intended values, execution can proceed to the block 403, where the computing system implementing the equivalence check tool can simulate the circuit designs with the input stimulus and perform an equivalence check on the circuit designs using the results of the simulation.

Figure 5:
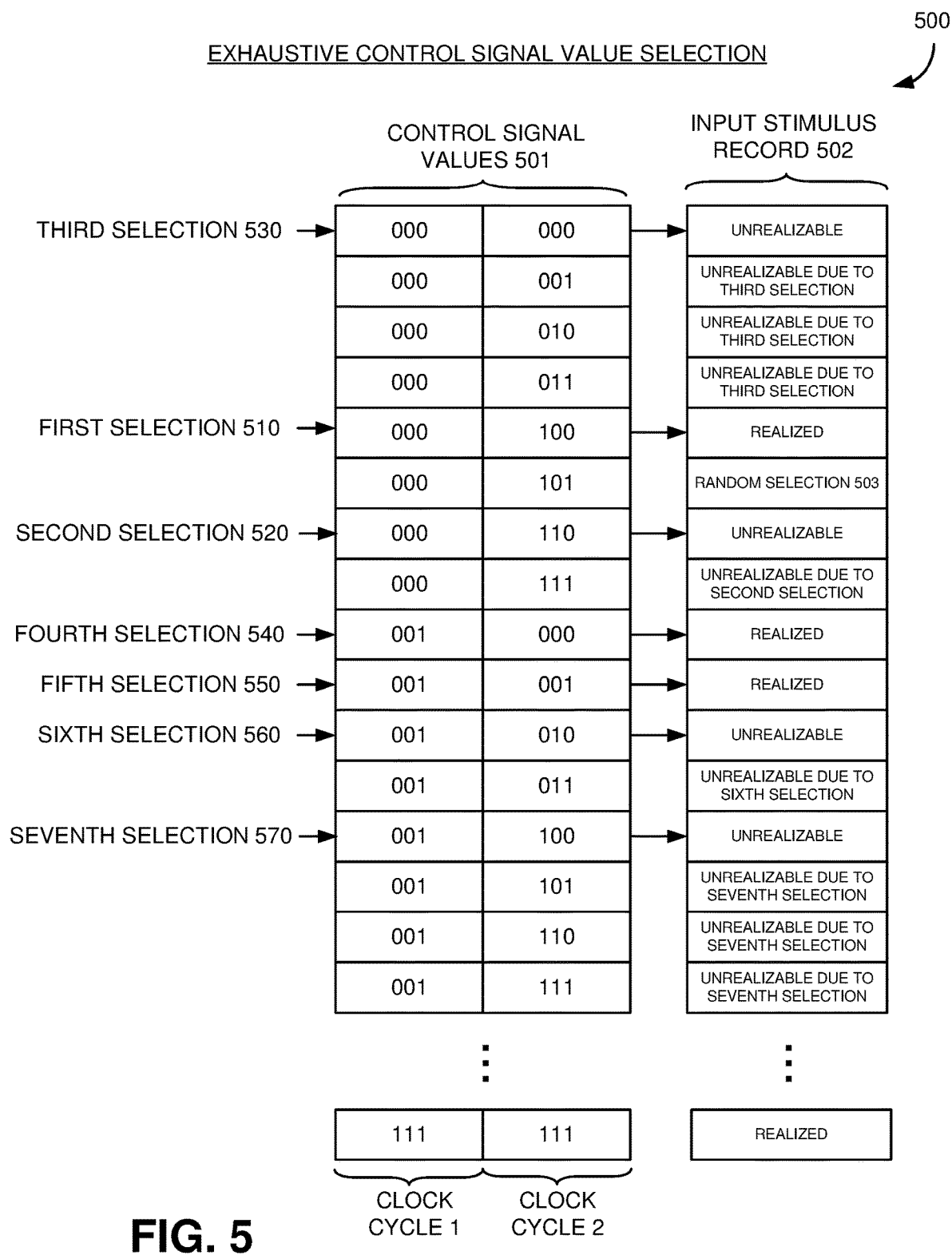
FIG. 5 illustrates an example table of control signals utilized to implement concolic stimulus generation for equivalence checking according to various embodiments of the invention.

FIG. 5 illustrates an example table 500 of control signal values 501 utilized to implement concolic stimulus generation for equivalence checking according to various embodiments of the invention. Referring to FIG. 5, an example of exhaustive control signal value selection and concolic stimulus generation is shown using the table 500. The table 500 can include a list of possible control signal values 501 internal to multiple circuit designs. In this example, the control signal values 501 can correspond to a set of three control signals and a search depth of two clock cycles, which corresponds to 64 different values of the control signals in the table 500. The table 500 also can include an input stimulus record 502 to identify whether the control signal values were realized in response to input stimulus being provided to the circuit designs during simulation or whether the concolic stimulus generation for equivalence checking determined the control signal values were unrealizable regardless of the input stimulus provided to the circuit designs during simulation.

This example exhaustive control signal value selection and concolic stimulus generation began with the generation of a random input stimulus that was provided to the circuit designs during simulation. The simulation of the circuit designs with the random input stimulus set the control signal values to "000101." The exhaustive control signal value selection and concolic stimulus generation can update the input stimulus record 502 corresponding to the control signal values to "000101" to indicate the input stimulus was a random selection 503. Since an equivalence check tool determined the circuit designs were found to be equivalent in response to the random input stimulus, the example exhaustive control signal value selection and concolic stimulus generation proceeded to make a first selection 510 of the control signal values 501. In some embodiments, the first selection 510 was made based on a depth-first search of the control signal values 501, for example, in a depth-first lexicographic order.

The first selection 510 corresponds to control signal values to "000100," which was used to identify input stimulus that, when provided to the circuit designs during simulation, could set the control signals to the values corresponding to the first selection 510. Since the example exhaustive control signal value selection and concolic stimulus generation could identify the input stimulus, the input stimulus record 502 indicated that the control signal values corresponding to the first selection 510 were realized. Since the equivalence check tool determined the circuit designs were found to be equivalent in response to the input stimulus corresponding to the first selection 510, the concolic stimulus generation proceeded to make a second selection 520 of the control signal values 501. In some embodiments, the second selection 520 was made based on a depth-first search of the control signal values 501, for example, in a depth-first lexicographic order.

The second selection 520 corresponds to control signal values to "000110," which was used to determine that there was no input stimulus that could set the control signals to the values corresponding to the second selection 520. Since the example exhaustive control signal value selection and concolic stimulus generation could not identify the input stimulus, the input stimulus record 502 indicated that the control signal values corresponding to the second selection 520 were unrealizable. The concolic stimulus generation was able to leverage the determination that the control signal values corresponding to the second selection 520 were unrealizable to also ascertain that control signal values "000111" were also unrealizable and updated the input stimulus record 502 accordingly.

The example exhaustive control signal value selection and concolic stimulus generation proceeded to make a third selection 530 of the control signal values 501. In some embodiments, the third selection 530 was made based on a depth-first search of the control signal values 501, for example, in a depth-first lexicographic order. The third selection 530 corresponds to control signal values to "000000," which was used to determine that there was no input stimulus that could set the control signals to the values corresponding to the third selection 530. Since the example exhaustive control signal value selection and concolic stimulus generation could not identify the input stimulus, the input stimulus record 502 indicated that the control signal values corresponding to the third selection 530 were unrealizable. The concolic stimulus generation was able to leverage the determination that the control signal values corresponding to the third selection 530 were unrealizable to also ascertain that control signal values "000001," "000010," and "000011" were also unrealizable and updated the input stimulus record 502 accordingly.

The example exhaustive control signal value selection and concolic stimulus generation proceeded to make a fourth selection 540 of the control signal values 501. In some embodiments, the fourth selection 540 was made based on a depth-first search of the control signal values 501, for example, in a depth-first lexicographic order. The fourth selection 540 corresponds to control signal values to "001000," which was used to identify input stimulus that, when provided to the circuit designs during simulation, could set the control signals to the values corresponding to the fourth selection 540. Since the example exhaustive control signal value selection and concolic stimulus generation could identify the input stimulus, the input stimulus record 502 indicated that the control signal values corresponding to the fourth selection 540 were realized. Since the equivalence check tool determined the circuit designs were found to be equivalent in response to the input stimulus corresponding to the fourth selection 540, the concolic stimulus generation proceeded to make a fifth selection 550 of the control signal values 501. In some embodiments, the fifth selection 550 was made based on a depth-first search of the control signal values 501, for example, in a depth-first lexicographic order.

The fifth selection 550 corresponds to control signal values to "001001," which was used to identify input stimulus that, when provided to the circuit designs during simulation, could set the control signals to the values corresponding to the fifth selection 550. Since the example exhaustive control signal value selection and concolic stimulus generation could identify the input stimulus, the input stimulus record 502 indicated that the control signal values corresponding to the fifth selection 550 were realized. Since the equivalence check tool determined the circuit designs were found to be equivalent in response to the input stimulus corresponding to the fifth selection 550, the concolic stimulus generation proceeded to make a sixth selection 560 of the control signal values 501. In some embodiments, the sixth selection 560 was made based on a depth-first search of the control signal values 501, for example, in a depth-first lexicographic order.

The sixth selection 560 corresponds to control signal values to "001010," which was used to determine that there was no input stimulus that could set the control signals to the values corresponding to the sixth selection 560. Since the example exhaustive control signal value selection and concolic stimulus generation could not identify the input stimulus, the input stimulus record 502 indicated that the control signal values corresponding to the sixth selection 560 were unrealizable. The concolic stimulus generation was able to leverage the determination that the control signal values corresponding to the sixth selection 560 were unrealizable to also ascertain that control signal values "001011" was also unrealizable and updated the input stimulus record 502 accordingly.

The example exhaustive control signal value selection and concolic stimulus generation proceeded to make a seventh selection 570 of the control signal values 501. In some embodiments, the seventh selection 570 was made based on a depth-first search of the control signal values 501, for example, in a depth-first lexicographic order. The seventh selection 570 corresponds to control signal values to "001100," which was used to determine that there was no input stimulus that could set the control signals to the values corresponding to the seventh selection 570. Since the example exhaustive control signal value selection and concolic stimulus generation could not identify the input stimulus, the input stimulus record 502 indicated that the control signal values corresponding to the seventh selection 570 were unrealizable. The concolic stimulus generation was able to leverage the determination that the control signal values corresponding to the seventh selection 570 were unrealizable to also ascertain that control signal values "001101," "001110," and "001111" were also unrealizable and updated the input stimulus record 502 accordingly. The example exhaustive control signal value selection and concolic stimulus generation proceeded with exhaustively selecting control signal values 501 in the table 500 or determining they were unrealizable until each control signal value had a corresponding entry in the input stimulus record 502.

Figure 6:
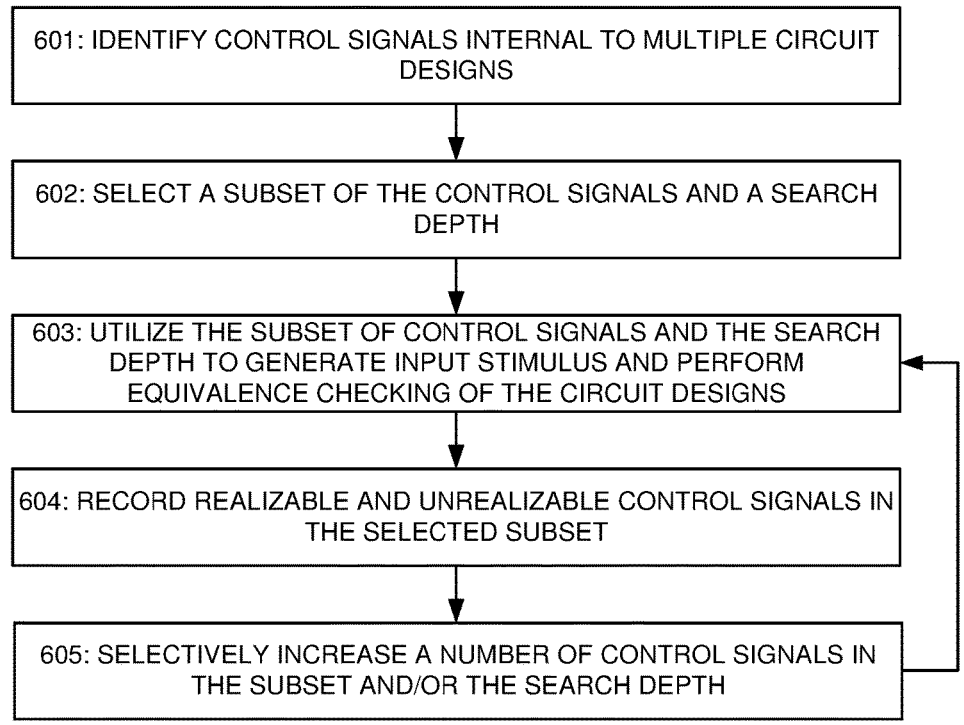
FIG. 6 illustrates a flowchart showing an example implementation of an incremental equivalence checking using concolic stimulus generation according to various embodiments of the invention.

FIG. 6 illustrates a flowchart showing an example implementation of an incremental equivalence checking using concolic stimulus generation according to various embodiments of the invention. Referring to FIG. 6, in a block 601, a computing system implementing an equivalence check tool can identify control signals internal to multiple circuit designs. In some embodiments, the control signals can correspond to selection signals for multiplexors in an RTL version of the circuit designs. The control signals also can correspond to "if" statement, branch statements, or the like, in a SystemC, C++, or the like, version of the circuit designs.

In a block 602, the computing system implementing the equivalence check tool can select a subset of the control signals and a search depth that corresponds to a number of clock cycles for the control signals. Since utilizing a constraint solver to identify input stimulus from control signal values can be time and resource intensive, the computing system can initially select a smaller number of control signals and/or a smaller search depth, which can be incrementally increased in subsequent blocks.

In a block 603, the computing system implementing the equivalence check tool can utilize the subset of control signals and the search depth to generate input stimulus and perform equivalence checking of the circuit designs and, in a block 604, the computing system implementing the equivalence check tool can record realizable and unrealizable control signals in the selected subset. This operation can be similar to that described above with reference to FIG. 4 and/or FIG. 5. For example, if, in the block 603, the results of the simulation indicate a lack of equivalence between the circuit designs, the computing system can exit the process and report the lack of equivalence and a counter example of equivalence.

When the blocks 603 and 604 are performed and the circuit designs are found to be equivalent for the selected controls signals and search depth, execution can proceed to a block 605, where the computing system implementing the equivalence check tool can selectively increase a number of control signals in the subset and/or the search depth. The computing system can identify a new set of possible values for the control signals given the search depth based on the selective increase and allow execution to proceed back to block 603 for the stimulus generation and equivalence checking of the new set of possible values. Since the computing system determines unrealizable control signals using a depth-first lexicographic search order in the block 603, the computing system can leverage the determination that some control values were previously found to be unrealizable in block 603 in order to ascertain that control signal values in the new set of possible control values are also unrealizable. By leveraging of previous determinations that some control signal values were unrealizable, the computing system can avoid having to select groups of control signal values in the new set of possible values and avoid having to utilize the constraint solver to attempt to find input stimulus for control signal values that will be found to be unrealizable. The computing system can continue the incremental process of selectively increasing the control signals and/or search depth until a counter example has been found or until the computing system has reached a programmable threshold number of control signals and programmable threshold search depth.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:
1. A method comprising:
 selecting, by a computing system, a set of one or more values for control signals internal to multiple circuit designs;

generating, by the computing system, input stimulus for the circuit designs based, at least in part, on the selected set of values for the control signals;

simulating, by the computing system, the circuit designs with the input stimulus, which configures the simulated values of the control signals internal to the circuits designs to the selected set of values; and performing, by the computing system, an equivalence check on the circuit designs using results of the simulation.

2. The method of claim 1, further comprising:

selecting, by the computing system, another set of values for the control signals; and determining, by the computing system, the another set of values for the control signals are not realizable during simulation with any input stimulus.

3. The method of claim 2, further comprising utilizing, by the computing system, the determination that the another set of values for the control signals are not realizable to identify one or more additional sets of values for the control signals are also not realizable.

4. The method of claim 1, wherein generating the input stimulus for the multiple circuit designs further comprises identifying environmental constraints for the control signals in the circuit designs, and utilizing a constraint solver to identify the input stimulus capable of configuring the simulated values of the control signals internal to the circuits designs to the selected set of values.

5. The method of claim 1, wherein performing the equivalence check on the circuit designs further comprises identifying the circuit designs are not functionally equivalent in response to the input stimulus, and outputting the input stimulus as a counter example to equivalence of the circuit designs.

6. The method of claim 1, wherein performing the equivalence check on the circuit designs further comprises identifying the circuit designs are functionally equivalent for all possible sets of values for control signals.

7. The method of claim 1, further comprising incrementally altering, by the computing system, at least one of a number of values in the sets of values for the control signals or a search depth for the selection of the set of values for the control signals.

8. A system comprising:

a memory system configured to store computer-executable instructions; and a computing system, in response to execution of the computer-executable instructions, is configured to:

select a set of one or more values for control signals internal to multiple circuit designs;

generate input stimulus for the circuit designs based, at least in part, on the selected set of values for the control signals;

simulate the circuit designs with the input stimulus, which configures the simulated values of the control signals internal to the circuits designs to the selected set of values; and perform an equivalence check on the circuit designs using results of the simulation.

9. The system of claim 8, wherein the computing system, in response to execution of the computer-executable instructions, is further configured to select another set of values for the control signals; and determine the another set of values for the control signals are not realizable during simulation with any input stimulus.

10. The system of claim 9, wherein the computing system, in response to execution of the computer-executable instructions, is further configured to utilize the determination that the another set of values for the control signals are not realizable to identify one or more additional sets of values for the control signals are also not realizable.

11. The system of claim 8, wherein the generation of the input stimulus for the multiple circuit designs further comprises identifying environmental constraints for the control signals in the circuit designs, and utilizing a constraint solver to identify the input stimulus capable of configuring the simulated values of the control signals internal to the circuits designs to the selected set of values.

12. The system of claim 8, wherein the performance of the equivalence check on the circuit designs further comprises identifying the circuit designs are not functionally equivalent in response to the input stimulus, and outputting the input stimulus as a counter example to equivalence of the circuit designs.

13. The system of claim 8, wherein the computing system, in response to execution of the computer-executable instructions, is further configured to incrementally alter at least one of a number of values in the sets of values for the control signals or a search depth for the selection of the set of values for the control signals.

14. An apparatus comprising at least one computer-readable memory device storing instructions configured to cause one or more processing devices to perform operations comprising:

selecting a set of one or more values for control signals internal to multiple circuit designs;

generating input stimulus for the circuit designs based, at least in part, on the selected set of values for the control signals;

simulating the circuit designs with the input stimulus, which configures the simulated values of the control signals internal to the circuits designs to the selected set of values; and performing an equivalence check on the circuit designs using results of the simulation.

15. The apparatus of claim 14, wherein the instructions are configured to cause the one or more processing devices to perform operations further comprising:

selecting another set of values for the control signals; and determining the another set of values for the control signals are not realizable during simulation with any input stimulus.

16. The apparatus of claim 15, wherein the instructions are configured to cause the one or more processing devices to perform operations further comprising utilizing the determination that the another set of values for the control signals are not realizable to identify one or more additional sets of values for the control signals are also not realizable.

17. The apparatus of claim 14, wherein generating the input stimulus for the multiple circuit designs further comprises identifying environmental constraints for the control signals in the circuit designs, and utilizing a constraint solver to identify the input stimulus capable of configuring the simulated values of the control signals internal to the circuits designs to the selected set of values.

18. The apparatus of claim 14, wherein performing the equivalence check on the circuit designs further comprises identifying the circuit designs are not functionally equivalent in response to the input stimulus, and outputting the input stimulus as a counter example to equivalence of the circuit designs.

19. The apparatus of claim 14, wherein performing the equivalence check on the circuit designs further comprises identifying the circuit designs are functionally equivalent for all possible sets of values for control signals.

20. The apparatus of claim 14, wherein the instructions are configured to cause the one or more processing devices to perform operations further comprising incrementally altering at least one of a number of values in the sets of values for the control signals or a search depth for the selection of the set of values for the control signals.

* * * * *